United States Patent
Chew et al.

(10) Patent No.: US 7,141,779 B1
(45) Date of Patent: Nov. 28, 2006

(54) SYSTEM AND METHOD FOR EMITTING AND DETECTING LIGHT USING LIGHT EMITTING DIODE

(75) Inventors: Tong Fatt Chew, Penang (MY); Gim Eng Chew, Penang (MY); Kheng Guan Peh, Kedah (MY); Yew Cheong Kuan, Penang (MY); Kevin John Theseira, Singapore (SG); Yih Sien Teh, Penang (MY); Eit Thian Yap, Penang (MY); Kevin Len Li Lim, Perak (MY); Joon Chok Lee, Sarawak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/230,708

(22) Filed: Sep. 19, 2005

(51) Int. Cl.
*H03F 3/08* (2006.01)

(52) U.S. Cl. .................... 250/214 A; 330/308
(58) Field of Classification Search ............ 250/214 A; 330/308
See application file for complete search history.

(56) References Cited

U.S. PATENT DOCUMENTS

| 6,486,726 | B1 | 11/2002 | Worley, Sr. et al. |
| 2006/0145053 | A1* | 7/2006 | Stevenson et al. .......... 250/205 |

* cited by examiner

*Primary Examiner*—John R. Lee

(57) ABSTRACT

A system and method for emitting and detecting light uses a light emitting device, e.g., a light emitting diode, to emit light and to detect incident light. As an example, the system and method may be used in a digital camera, a camera phone or an illuminated device, such as a liquid crystal display device.

20 Claims, 4 Drawing Sheets

SYSTEM AND METHOD FOR EMITTING AND DETECTING LIGHT USING LIGHT EMITTING DIODE

BACKGROUND OF THE INVENTION

Light emitting diodes (LEDs) are semiconductor light emitters that can emit light in one or various colors, such as ultraviolet, blue, green, yellow or red. LEDs have been improved to a point with respect to operating efficiency such that LEDs are now replacing conventional light sources in traditional lighting applications, such as backlighting for LCD displays, traffic signal lights, automotive taillights and electronic flashes. This is due in part to the fact that LEDs have many advantages over conventional light sources. These advantages include longer operating life, lower power consumption, and smaller size.

In some devices, one or more photodetectors are used with LEDs to sense incident light, which may be from an external source or the LEDs. As an example, a camera cell phone includes one or more LEDs and a photodetector. The LEDs are used to produce a flash of light when taking a picture under low light conditions. The LEDs require a circuit to provide driving signals to the LEDs in order to activate the LEDs. The LEDs also typically require optics to focus the light emitted from the LEDs. The photodetector is used to detect ambient light conditions so that the light function of the camera cell phone can be set to an appropriate setting, e.g., the LEDs can be set to either "ON" or "OFF" mode. The photodetector requires its own circuit to measure the amount of current generated by the photodetector in response to incident light. Similar to the LEDs, the photodetector also typically requires optics to focus the incident light onto the photodetector.

A concern with the conventional system of LEDs and photodetector is that the associated optics and circuits to operate the LEDs and the photodetector require a significant amount of space in the camera cell phone. This requirement hinders the development of more compact camera cell phones. The associated optics and circuits also add to weight and manufacturing cost of the camera cell phone.

Another concern with the conventional system of LEDs and photodetector is that the photodetector requires an additional opening on the same side of the camera cell phone as the LEDs, which tends to cause aesthetic and styling issues to camera cell phone designers.

In view of these concerns, what is needed is a system and method for emitting and detecting light that requires less circuitry and optics, and eliminates the need for an additional opening in the camera cell phone.

SUMMARY OF THE INVENTION

A system and method for emitting and detecting light uses a light emitting device, e.g., a light emitting diode, to emit light and to detect incident light. Thus, the light emitting device is used as both a light emitter and a photodetector. The dual use of the light emitting device results in fewer components for the system, which translates into smaller space requirement, lower manufacturing cost and reduced weight. As an example, the system and method may be used in a digital camera, a camera phone or an illuminated device, such as a liquid crystal display device.

A system in accordance with an embodiment of the invention comprises a light emitting device, a signal generator, an amplifier and first and second switches. The light emitting device is configured to emit light in response to a driving signal and to generate a photo-signal in response to incident light. The light emitting device may be a light emitting diode. The signal generator is configured to provide the driving signal to activate the light emitting device. The signal generator may be a current source. The amplifier is configured to amplify the photo-signal from the light emitting device. The first switch is connected between the light emitting device and the signal generator. The first switch is configured to selectively connect the signal generator to the light emitting device to transmit the driving signal from the signal generator to the light emitting device. The second switch is connected between the light emitting device and the amplifier. The second switch is configured to selectively connect the light emitting device to the amplifier to transmit the photo-signal from the light emitting device to the amplifier.

A method for emitting and detecting light in accordance with an embodiment of the invention comprises connecting a signal generator to a light emitting device, including disconnecting an amplifier from the light emitting device, transmitting a driving signal from the signal generator to the light emitting device, generating light at the light emitting device in response to the driving signal, connecting the amplifier to the light emitting device, including disconnecting the signal generator from the light emitting device, generating a photo-signal at the light emitting device in response to incident light, and transmitting the photo-signal from the light emitting device to the amplifier to amplify the photo-signal.

Other aspects and advantages of the present invention will become apparent from the following detailed description, taken in conjunction with the accompanying drawings, illustrated by way of example of the principles of the invention.

DETAILED DESCRIPTION

Figure 1:
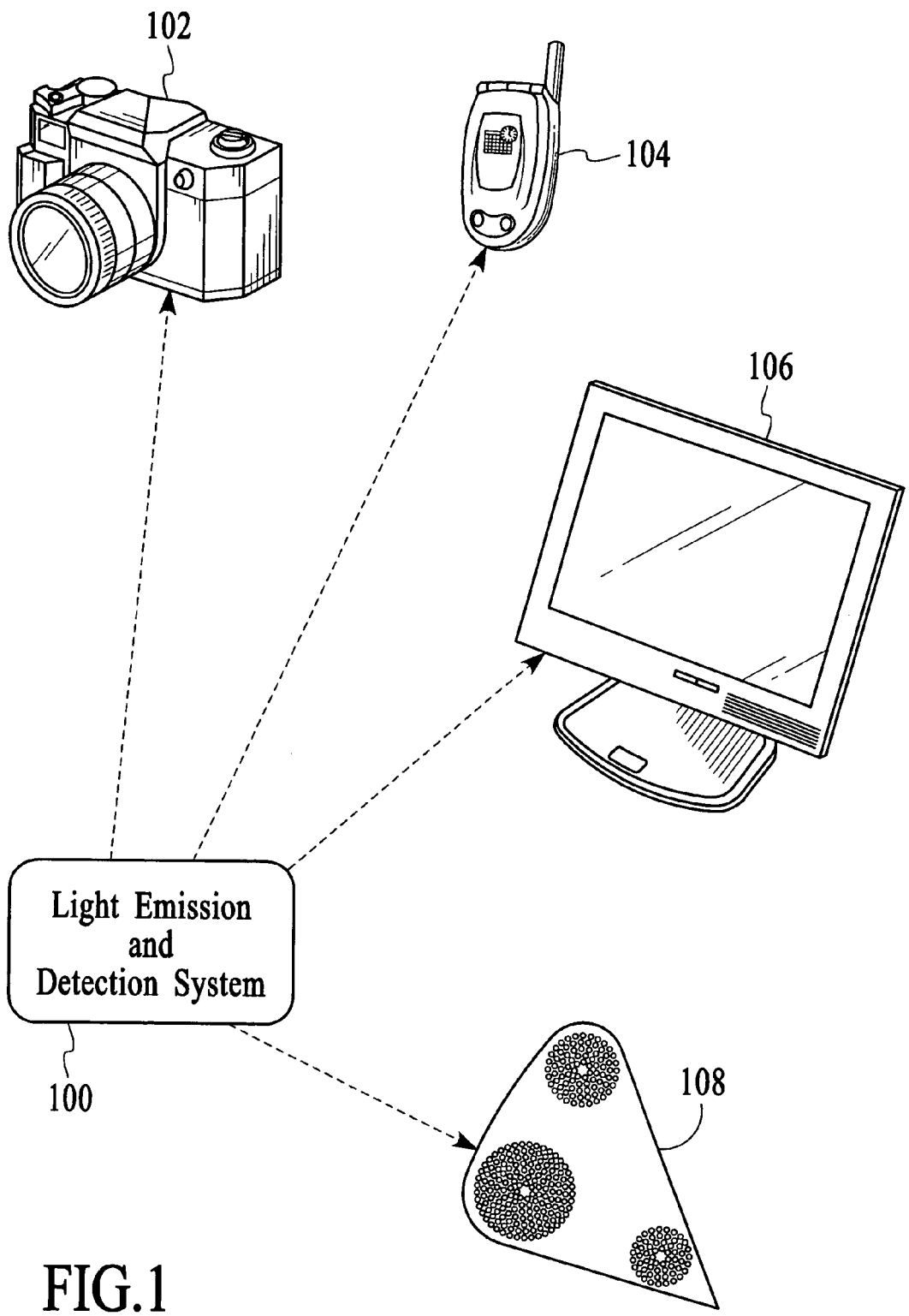
FIG. 1 shows a light emission and detection system in accordance with an embodiment of the invention, which may be included in a digital camera, a camera cell phone, a liquid crystal display (LCD) device or an automotive lamp.

With reference to FIG. 1, a light emission and detection system 100 in accordance with an embodiment of the invention is described. The light emission and detection system 100 uses one or more semiconductor light emitting devices, such as light emitting diodes (LEDs), to both emit and detect light. Thus, the light emission and detection system 100 uses a semiconductor light emitting device as both a light emitter and a photodetector. As illustrated in FIG. 1, the light emission and detection system 100 can be used in any device in which a light emitter and a photodetector may be needed, such as a digital camera 102, a camera cell phone 104 or an illuminated device, e.g., a liquid crystal display (LCD) device 106 or an automotive taillight 108. Since a semiconductor light emitting device is used as both a light emitter and a photodetector, the light emission and detection system 100 require fewer electrical components than comparable conventional systems. This advantage translates into smaller space requirement, lower manufacturing cost and reduced weight. These qualities are particularly desirable for compact mobile devices, such as a camera cell phone. The light emission and detection system 100 is described in more detail below with reference to FIG. 2.

Figure 2:
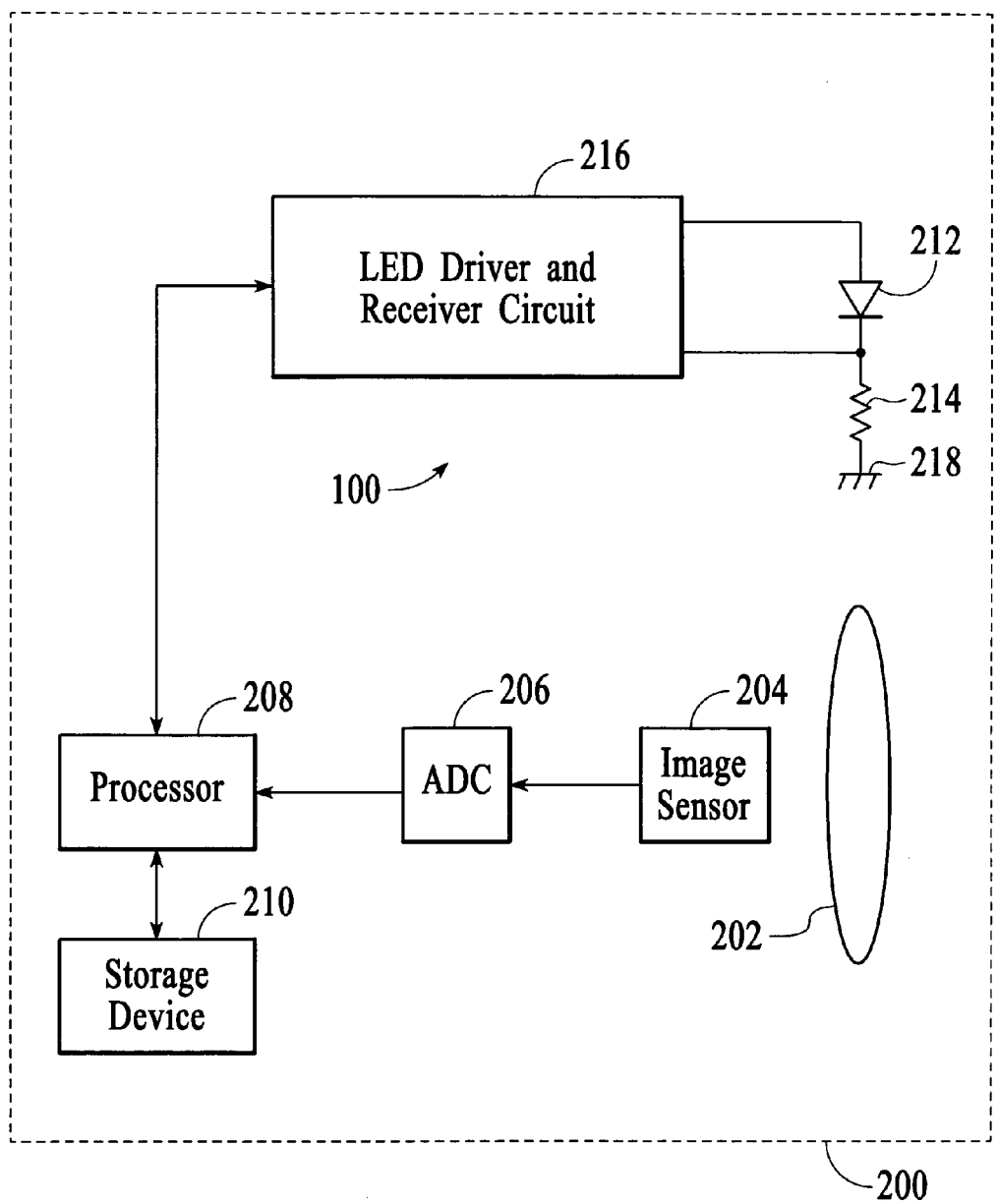
FIG. 2 is a block diagram of a digital imaging device with the light emission and detection system in accordance an embodiment of the invention.

In FIG. 2, a digital imaging device 200 with the light emission and detection system 100 in accordance with an embodiment of the invention is shown. The digital imaging device 200 may be a digital camera, a camera cell phone or any device that can electronically capture images. The imaging device 200 includes a lens 202, an image sensor 204, an analog-to-digital converter (ADC) 206, a processor 208, a storage device 210 and the light emission and detection system 100. The imaging device 200 also includes other components that are commonly found in a digital imaging device. However, these common components are not shown or described herein so that the inventive features of the invention are not obscured. The lens 202 is used to focus a scene of interest onto the image sensor 204 to capture an image of that scene. The image sensor 204 is used to electronically capture an image of the scene of interest by generating an electrical charge at each pixel of the image sensor in response to received light at that pixel. As an example, the image sensor 204 may be a Charged Coupled Device (CCD) or a metal-oxide semiconductor (MOS) image sensor. The electrical charges generated by the image sensor 204 are converted to digital signals by the ADC 206 for signal processing.

The processor 208 of the imaging device 200 processes the digital signals from the ADC 206 to produce a digital image of the captured scene of interest. The processes performed by the processor 208 may include, for example, demosaicing, image enhancements and compression. The resulting digital image is stored in the storage device 210, which may include a removable memory card. The processor 208 also controls the light emission and detection system 100, as well as other components of the imaging device 200, such as the image sensor 204, the ADC 206 and the storage device 210.

The light emission and detection system 100 can operate in either a light emitting mode or a light detecting mode. In the light emitting mode, the light emission and detection system 100 operates to emit light, which in this embodiment is used to produce a flash of light or a continuous light to illuminate a scene of interest. In the light detecting mode, the light emission and detection system 100 operates to detect incident light, which in this embodiment is used to measure the ambient light to determine whether artificial light in the form of a flash of light or a continuous light is needed.

As shown in FIG. 2, the light emission and detection system 100 comprises a light emitting device in the form of an LED 212, a resistor 214 and an LED driver and receiver circuit 216. The LED 212 is connected in series with the resistor 216 to electrical ground 218. The LED 212 is a semiconductor device that emits light in response to applied electrical current when the LED is forward biased. In addition, the LED 212 generates electrical current ("photocurrent") in response to incident light when the LED is reverse biased. The LED 212 may be designed to emit a particular color light, such as red, green or blue light. Alternatively, the LED 212 may be designed to emit white light using a photoluminescent material, such as phosphor. As illustrated in FIG. 2, the light emission and detection system 100 may include only a single LED, which is electrically connected to the LED driver and receiver circuit 216. However, in other embodiments, the light emission and detection system 100 may include additional LEDs (not shown), which may all be electrically connected to the LED driver and receiver circuit 216 or additional LED driver and receiver circuits (not shown).

The LED driver and receiver circuit 216 of the light emission and detection system 100 operates to set the bias of the LED 212 to either the light emitting mode (forward bias) or the light detecting mode (reverse bias). In the light emitting mode, the LED driver and receiver circuit 216 provides a driving signal in the form of electrical current to the LED 212 to use the LED as a light emitter. In the light detecting mode, the LED driver and receiver circuit 216 receives and amplifies the photo-signal in the form of photocurrent from the LED 212. The photocurrent is generated by the LED 212 in response to incident light. The LED driver and receiver circuit 216 may be implemented as a single integrated circuit (IC).

Figure 3:
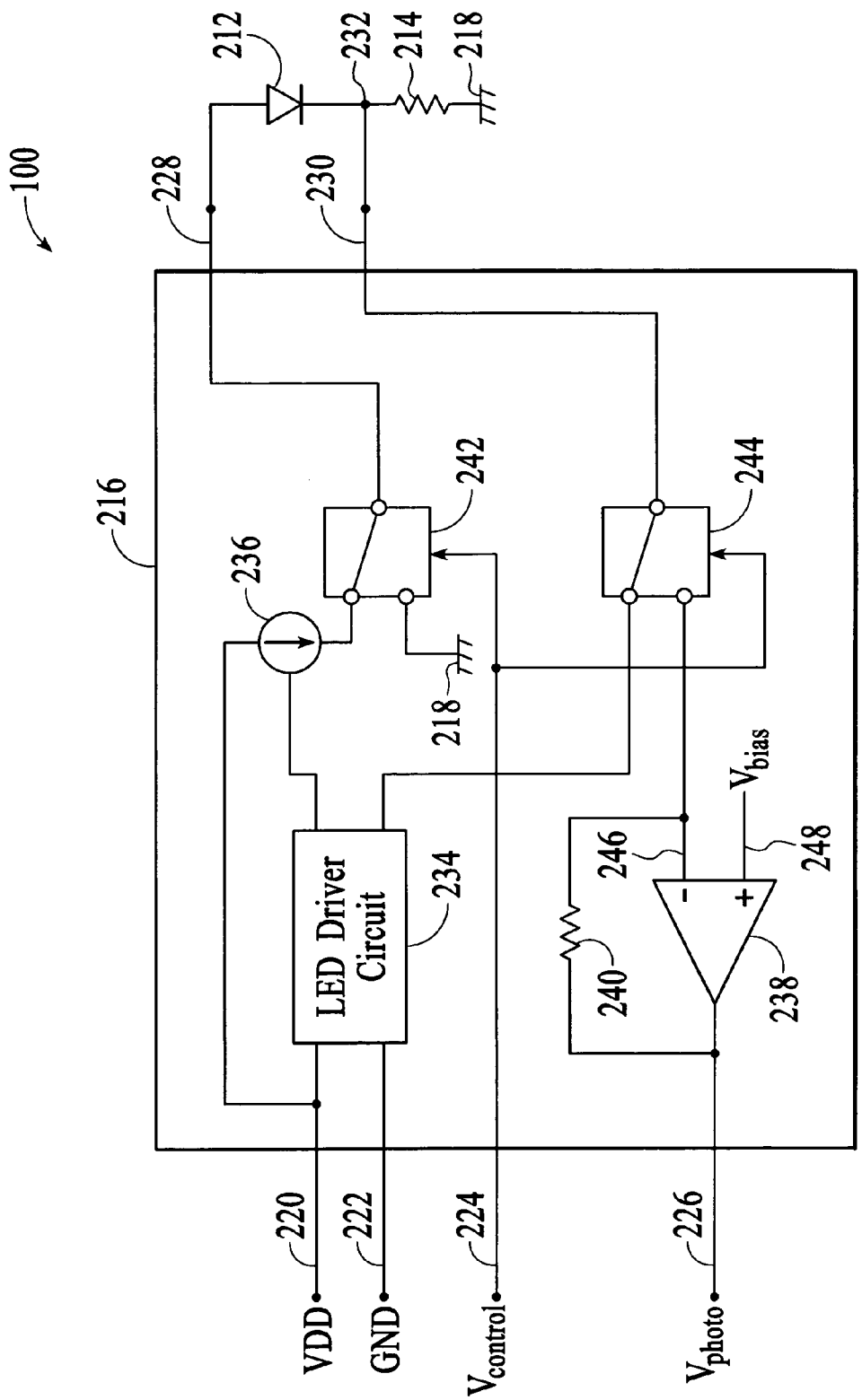
FIG. 3 is a more detailed block diagram of the light emission and detection system in accordance with an embodiment of the invention.

The light emission and detection system 100 is shown in more detail in FIG. 3, which shows the components of the LED driver and receiver circuit 216. As shown in FIG. 3, the LED driver and receiver circuit 216 has six pins 220, 222, 224, 226, 228 and 230. The pin 220 is connected to a high voltage supply, such as VDD, while the pin 222 is connected to electrical ground GND. The pin 228 is connected to the anode of the LED 212, while the pin 230 is connected to the cathode of the LED at a node 232 between the LED and the resistor 214, which is connected to electrical ground 218. The pin 224 is connected to the processor 208 to receive control signals $V_{control}$ from the processor to set the light emission and detection system 100 to either the light emitting or light detecting mode. The pin 226 is connected to the processor 208 to transmit an amplified voltage signal $V_{photo}$ of the photo-signal generated by the LED 212 in response to incident light during the light detecting mode.

The LED driver and receiver circuit 216 further includes an LED driver circuit 234, a current source 236, an amplifier 238, a resistor 240 and the switches 242 and 244. The LED driver circuit 234 is connected to the pins 220 and 222 to receive electrical power. The LED driver circuit 234 is also connected the current source 236 to control the current source, which produces a driving current to activate the LED 212 to emit light. The current source 236 is also connected to the pin 220 to receive power to generate the driving current. The LED driver circuit 234 is also connected to the pin 230 via the switch 244 to receive feedback when the LED 212 is driven as a light emitter. The switch 242 is connected to the current source 236, electrical ground 218 and the pin 228. The switch 242 is configured to connect the current source 236 to the pin 228 during the light emitting mode or to connect the pin 228 to ground 218 during the light detecting mode. The switch 242 is also connected to the pin 224 to receive control signals from the processor 208, which controls the switch 242. The switch 242 may be implemented using transistors, such as metal oxide semiconductor (MOS) transistors or bipolar transistors.

The other switch 244 of the LED driver and receiver circuit 216 is connected to the pin 230, an input 246 of the amplifier 238 and the LED driver circuit 234. The switch 244 is configured to connect the pin 230 to the LED driver circuit 234 to transmit feedback information regarding the driving conditions of the LED 212 during the light emitting mode or to connect the pin 230 to the input 246 of the amplifier 238 during the light detecting mode. The switch 244 is also connected to the pin 224 to receive control signals from the processor 208, which controls the switch 244 as well as the switch 242. The switch 244 may also be implemented using transistors, such as metal oxide semiconductor (MOS) transistors or bipolar transistors.

The amplifier 238 includes another input 248, which is connected to receive a bias signal, $V_{bias}$. The resistor 240 is connected between the input 246 and the output of the amplifier 238. The amplifier 238 operates to convert the photocurrent generated by the LED 212 to an amplified voltage signal, which provides information regarding the intensity of the incident light on the LED 212. Thus, the amplifier 238 is a current-to-voltage amplifier. The output of the amplifier 238 is connected to the pin 226 to transmit the amplified voltage signal to the processor 208.

The operations of the light emission and detection system 100 are now described. In order to operate the light emission and detection system 100 in either the light emitting mode or the light detecting mode, a control signal is transmitted to the switches 242 and 244 via the pin 224. To set the light emission and detection system 100 to the light emitting mode, a particular control signal is transmitted to the switch 242 to electrically connect the current source 236 to the pin 228, which is connected to the anode of the LED 212. The control signal is also transmitted to the switch 244 to electrically connect the pin 230, which is connected to the cathode of the LED 212, to the LED driver circuit 234. In the light emitting mode, the LED driver circuit 234 controls the current source 236 so that the current source produces a driving signal in the form of electrical current. The driving signal is transmitted to the anode of the LED 212 through the switch 242 so that the LED is forward biased with the driving signal. The driving signal activates the LED 212 to emit light. Furthermore, a signal at the cathode of the LED 212 is transmitted to the LED driver circuit 234 through the switch 244 to provide a feedback information of the driving signal being applied to the LED.

To set the light emission and detection system 100 to the light detecting mode, a different control signal is transmitted to the switch 242 to electrically connected the pin 228, which is connected to the anode of the LED 212, to electrical ground 218. This control signal is also transmitted to the switch 244 to electrically connect the pin 230, which is connected to the cathode of the LED 212, to the input 246 of the amplifier 238. In the light detecting mode, the photocurrent generated by the LED 212 in response to incident light is transmitted to the input 246 of the amplifier 238 through the switch 244. The amplifier 238 then converts and amplifies the photocurrent to an amplified voltage signal, which is output to the pin 226. The amplified voltage signal can then be transmitted to the processor 208 to be used, for example, to determine whether the LED 212 should be driven to produce a flash of light or a continuous light to illuminate a scene of interest.

In the digital imaging device 200, the light emission and detection system 100 is used to detect ambient light to determine whether artificial light is needed. However, in another device, the light emission and detection system 100 may be used to detect the light generated by that device. As an example, in the LCD device 106, the light emission and detection system 100 may be used to detect the backlighting produced by other LEDs included in the LCD device.

Figure 4:
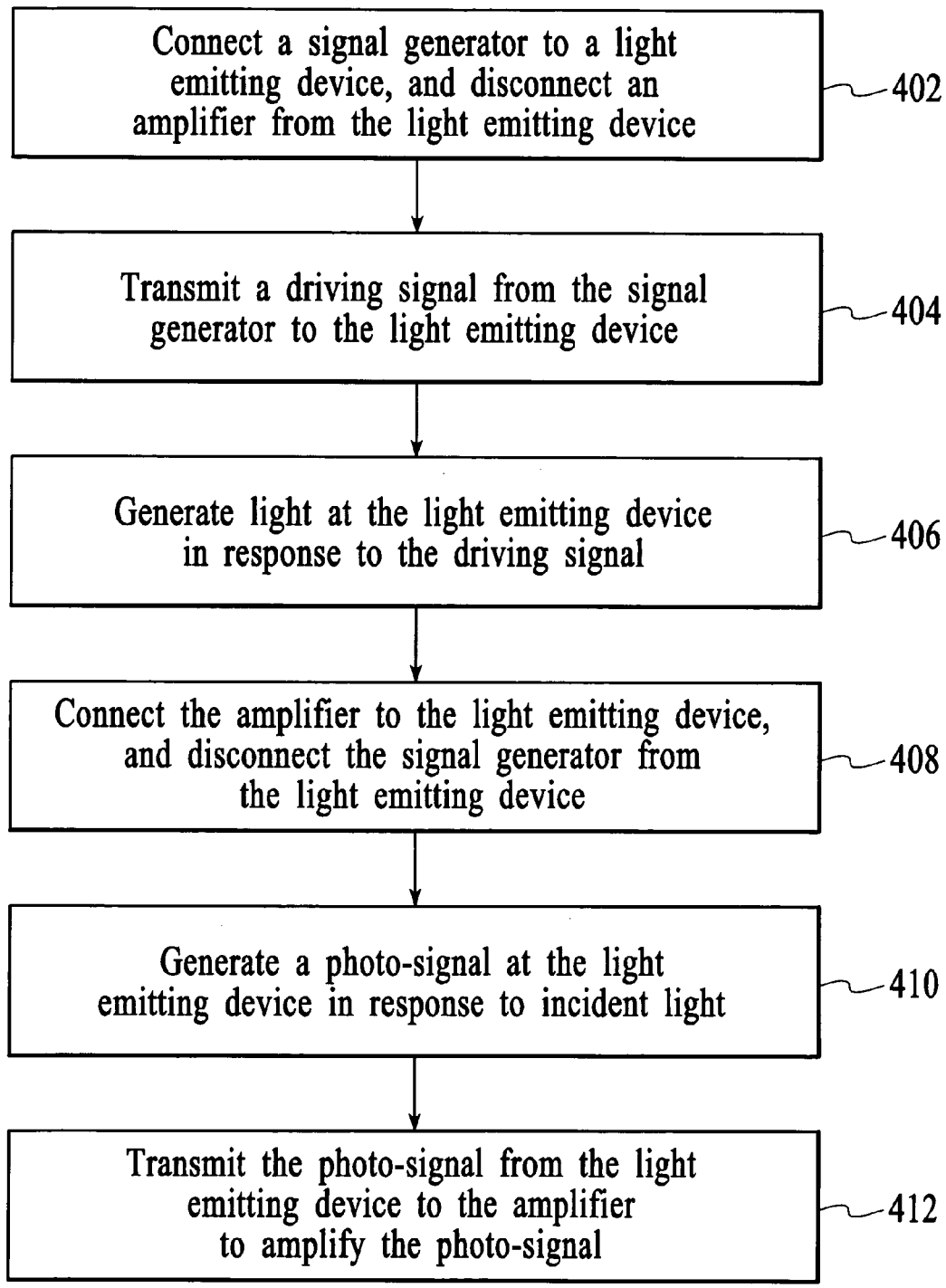
FIG. 4 is a flow diagram of a method for emitting and detecting light in accordance with an embodiment of the invention.

A method for emitting and detecting light in accordance with an embodiment of the invention is described with reference to the flow diagram of FIG. 4. At block 402, a signal generator is connected to a light emitting device, and an amplifier is disconnected from the light emitting device. As an example, the signal generator may be a current source and the light emitting device may be an LED. Next, at block 404, a driving signal is transmitted from the signal generator to the light emitting device. Next, at block 406, light is generated at the light emitting device in response to the driving signal. Next, at block 408, the amplifier is connected to the light emitting device, and the signal generator is disconnected from the light emitting device. Next, at block 410, a photo-signal is generated at the light emitting device in response to incident light. Next, at block 412, the photo-signal is transmitted to the amplifier to amplify the photo-signal. The amplified photo-signal can then be used to determine the intensity of the incident light.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for emitting and detecting light comprising:
    a light emitting device configured to emit light in response to a driving signal and to generate a photo-signal in response to incident light;
    a signal generator configured to provide said driving signal to activate said light emitting device;
    an amplifier configured to amplify said photo-signal from said light emitting device;
    a first switch connected between said light emitting device and said signal generator, said first switch being configured to selectively connect said signal generator to said light emitting device to transmit said driving signal from said signal generator to said light emitting device; and
    a second switch connected between said light emitting device and said amplifier, said second switch being configured to selectively connect said light emitting device to said amplifier to transmit said photo-signal from said light emitting device to said amplifier.

2. The system of claim 1 wherein said light emitting device includes a light emitting diode.

3. The system of claim 1 wherein said signal generator includes a current source configured to provide said driving signal in the form of an electrical current.

4. The system of claim 1 wherein said photo-signal is a photocurrent and wherein said amplifier is a current-to-voltage amplifier configured to produce an amplified voltage signal in response to said photocurrent.

5. The system of claim 1 wherein said first switch is also connected to electrical ground, said first switch being configured to selectively connect said light emitting device to one of said signal generator and said electrical ground.

6. The system of claim 1 further comprising a driver circuit connected to said signal generator.

7. The system of claim 6 wherein said second switch is also connected to said driver circuit, said second switch being configured to selectively connect said light emitting device to one of said amplifier and said driver circuit.

8. The system of claim 1 wherein said light emitting device, said signal generator, said amplifier, said first and second switches are included in a device consisting of a digital camera, a camera phone and an illuminated device.

9. A system for emitting and detecting light comprising:
    a light emitting diode having an anode and a cathode, said light emitting diode being configured to emit light in response to a driving current and to generate a photo-current in response to incident light;
    a current source configured to provide said driving current to activate said light emitting diode;

an amplifier configured to amplify said photocurrent from said light emitting diode;

a first switch connected between said anode of said light emitting diode and said current source, said first switch being configured to selectively connect said current source to said anode of said light emitting diode to transmit said driving current from said current source to said light emitting diode; and a second switch connected between said cathode of said light emitting diode and said amplifier, said second switch being configured to selectively connect said cathode of said light emitting diode to said amplifier to transmit said photocurrent from said light emitting diode to said amplifier.

10. The system of claim 9 wherein said amplifier is a current-to-voltage amplifier configured to produce an amplified voltage signal in response to said photocurrent.

11. The system of claim 9 wherein said first switch is also connected to electrical ground, said first switch being configured to selectively connect said anode of said light emitting diode to one of said current source and said electrical ground.

12. The system of claim 9 further comprising a driver circuit connected to said current source.

13. The system of claim 12 wherein said second switch is also connected to said driver circuit, said second switch being configured to selectively connect said cathode of said light emitting diode to one of said amplifier and said driver circuit.

14. The system of claim 9 wherein said light emitting diode, said current source, said amplifier, said first and second switches are included in a device consisting of a digital camera, a camera phone and an illuminated device.

15. A method for emitting and detecting light, said method comprising:

connecting a signal generator to a light emitting device, including disconnecting an amplifier from said light emitting device;

transmitting a driving signal from said signal generator to said light emitting device;

generating light at said light emitting device in response to said driving signal;

connecting said amplifier to said light emitting device, including disconnecting said signal generator from said light emitting device;

generating a photo-signal at said light emitting device in response to incident light; and transmitting said photo-signal from said light emitting device to said amplifier to amplify said photo-signal.

16. The method of claim 15 wherein said light emitting device includes a light emitting diode.

17. The method of claim 15 wherein said connecting said signal generator to said light emitting device includes also connecting said light emitting device to a driver circuit, said driver circuit being connected to said signal generator.

18. The method of claim 15 wherein said connecting said amplifier to said light emitting device includes also connecting said light emitting device to electrical ground.

19. The method of claim 15 wherein said connecting said signal generator to said light emitting device includes controlling a first switch connected between said signal generator and said light emitting device to connect said signal generator to said light emitting device.

20. The method of claim 19 wherein said connecting said amplifier to said light emitting device includes controlling a second switch connected between said amplifier and said light emitting device to connect said amplifier to said light emitting device.

* * * * *